(12) United States Patent
Sharma

(10) Patent No.: US 10,095,634 B2
(45) Date of Patent: Oct. 9, 2018

(54) IN-VEHICLE NETWORK (IVN) DEVICE AND METHOD FOR OPERATING AN IVN DEVICE

(71) Applicant: NXP B.V., Eindhoven (NL)

(72) Inventor: Vibhu Sharma, Eindhoven (NL)

(73) Assignee: NXP B.V., Eindhoven (NL)

( * ) Notice: Subject to any disclaimer, the term of this patent is extended or adjusted under 35 U.S.C. 154(b) by 198 days.

(21) Appl. No.: 14/720,132

(22) Filed: May 22, 2015

(65) Prior Publication Data

US 2016/0342531 A1 Nov. 24, 2016

(51) Int. Cl.
| | | |
|---|---|---|
| *G06F 11/30* | (2006.01) | |
| *G06F 12/14* | (2006.01) | |
| *G06F 21/56* | (2013.01) | |
| *H04L 29/06* | (2006.01) | |
| *G06F 13/42* | (2006.01) | |
| *H04L 12/40* | (2006.01) | |

(52) U.S. Cl.
CPC ...... *G06F 12/1408* (2013.01); *G06F 13/4265* (2013.01); *G06F 21/567* (2013.01); *H04L 12/40143* (2013.01); *H04L 63/1408* (2013.01); *G06F 2212/1052* (2013.01)

(58) Field of Classification Search
USPC .......................................... 713/193
See application file for complete search history.

(56) References Cited

U.S. PATENT DOCUMENTS

| | | |
|---|---|---|
| 6,314,351 B1 | 11/2001 | Chutorash |
| 6,654,351 B1 | 11/2003 | Casey |
| 7,885,405 B1 | 2/2011 | Bong |
| 8,925,083 B2 | 12/2014 | Niner et al. |
| 2003/0223586 A1 | 12/2003 | Green |
| 2005/0113068 A1* | 5/2005 | Hoffmann ............ H04L 9/3263 455/411 |
| 2005/0138386 A1 | 6/2005 | Le Saint |
| 2011/0093639 A1* | 4/2011 | Richards .......... H04L 12/40032 710/310 |
| 2011/0125855 A1* | 5/2011 | Hartwich ......... H04L 12/40032 709/206 |
| 2012/0271975 A1 | 10/2012 | Elend et al. |
| 2012/0297105 A1 | 11/2012 | Elend |

(Continued)

FOREIGN PATENT DOCUMENTS

| | | |
|---|---|---|
| CN | 101026527 A | 8/2007 |
| EP | 2797263 A1 | 10/2014 |

(Continued)

OTHER PUBLICATIONS

Japanese Information Technology Promotion Agency; "Approaches for Vehicle Information Security"; 55 pgs; Aug. 2013.
Koscher et al.; "Experimental security analysis of a modern automobile"; in Proc. IEEE Security Privacy. Symp.; Oakland, CA; pp. 447-462; 2010.
Checkoway, D. et al.; "Comprehensive Experimental Analysis of Automotive Attack Surfaces"; in Proceedings of the USENIX Security Symposium, San Francisco, CA; 16 pgs.; Aug. 2011.
Bosch; "CAN Specification"; version 2.0; 73 pgs.; 1991.
Bosch; "CAN with Flexible Data-Rate"; White paper, version 1.1; 16 pgs.; 2011.
Extended European Search Report for Patent Appln. No. 16170436.6 (dated Oct. 6, 2016).
Philips Semiconductors, "Product Specification PCA 82C200, Stand-alone CAN-conroller", 36 pgs. (Nov. 1992).

(Continued)

*Primary Examiner* — Jeffrey C Pwu
*Assistant Examiner* — Samuel Ambaye
(74) *Attorney, Agent, or Firm* — Rajeev Madnawat

(57) ABSTRACT

Embodiments of a device and method are disclosed. In an embodiment, an IVN transceiver is disclosed. The IVN transceiver includes an IVN bus interface, a microcontroller communications interface, and a security module connected between the IVN bus interface and the microcontroller communications interface and configured to perform a security function.

17 Claims, 18 Drawing Sheets

(56) References Cited

U.S. PATENT DOCUMENTS

| | | | |
|---|---|---|---|
| 2013/0227648 A1 | 8/2013 | Ricci | |
| 2013/0294460 A1 | 11/2013 | Hell | |
| 2014/0129748 A1 | 5/2014 | Muth | |
| 2014/0250531 A1 | 9/2014 | Moeller et al. | |
| 2014/0328352 A1* | 11/2014 | Mabuchi | H04L 12/4035 370/451 |
| 2014/0330996 A1 | 11/2014 | De Haas et al. | |
| 2014/0337976 A1* | 11/2014 | Moeller | H04L 63/1425 726/23 |
| 2014/0365693 A1* | 12/2014 | Monroe | G06F 13/385 710/105 |
| 2015/0085411 A1 | 3/2015 | Yang et al. | |
| 2015/0089236 A1* | 3/2015 | Han | H04L 9/3242 713/181 |
| 2015/0180840 A1 | 6/2015 | Jung et al. | |
| 2015/0229654 A1 | 8/2015 | Perier | |
| 2015/0359351 A1 | 12/2015 | Otsuka et al. | |

FOREIGN PATENT DOCUMENTS

| | | | |
|---|---|---|---|
| WO | 00/09363 | A1 | 2/2000 |
| WO | 2014115455 | A1 | 7/2014 |

OTHER PUBLICATIONS

Final Rejection dated Sep. 22, 2017 for U.S. Appl. No. 14/954,638 21 pages.

Non Final Office Action dated Jun. 15, 2017 for U.S. Appl. No. 14/954,638 15 pages.

Non-Final Rejection dated Mar. 9, 2017 for U.S. Appl. No. 14/812,909 17 pages.

Final Rejection dated May 5, 2017 for U.S. Appl. No. 14/812,909 21 pages.

Van Herrewege, A. et al.; "CAN Auth—A Simple, Backward Compatible Broadcast Authentication Protocol for CAN bus"; In ECRYPT Workshop on Lightwent Cryptography; 7 pgs; 2011.

Bosch; SMI700 for vehicle dynamics control, 1 pg. (2015).

Notice of Allowance dated Sep. 26, 2017 for U.S. Appl. No. 14/812,909 7 pages.

* cited by examiner

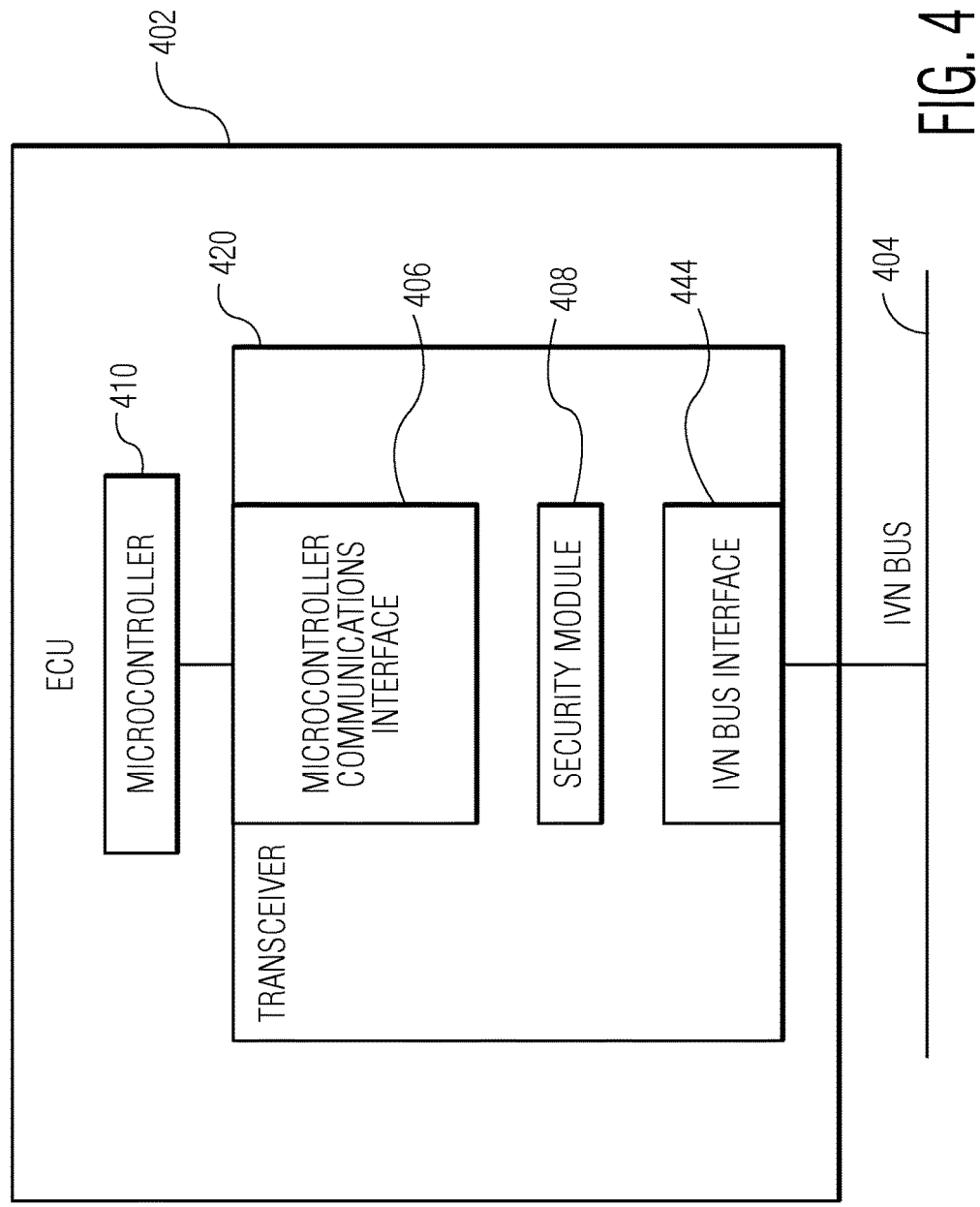

IN-VEHICLE NETWORK (IVN) DEVICE AND METHOD FOR OPERATING AN IVN DEVICE

BACKGROUND

An in-vehicle network (IVN) is used to facilitate communications between devices, such as electronic control units (ECU), within a vehicle. Vehicles can be interconnected, for example, connected to the Internet, e.g., to provide network access to passengers within the vehicles. However, connected vehicles can pose a serious threat to the integrity of the vehicles. For example, ECUs within an IVN of a vehicle that is connected to the Internet can be exposed to vulnerabilities caused by, for example, malware.

SUMMARY

Embodiments of an IVN device and a method for operating an IVN device are disclosed. In an embodiment, an IVN transceiver is disclosed. The IVN transceiver includes an IVN bus interface, a microcontroller communications interface, and a security module connected between the IVN bus interface and the microcontroller communications interface and configured to perform a security function.

In an embodiment, the security module includes a programmable cryptographic module configured to execute security software programs.

In an embodiment, the programmable cryptographic module includes a security core configured to execute security software routines, a random number generator configured to generate an encryption key, an encryption engine configured to perform message encryption using the encryption key, and a non-volatile memory (NVM) configured to store the encryption key.

In an embodiment, the encryption engine is further configured to perform message decryption using a decryption key, and where the NVM is further configured to store the decryption key.

In an embodiment, the NVM is further configured to store a set of policies for intrusion detection or intrusion prevention, and the programmable cryptographic module includes logic configured to implement detection or intrusion prevention.

In an embodiment, the programmable cryptographic module is configured to extract a data payload from a plurality of data frames received through the microcontroller communications interface and process the data payload to generate a Cipher-based Message Authentication Code (CMAC) digest. The IVN transceiver further includes a protocol controller configured to combine the payload with the CMAC digest.

In an embodiment, the programmable cryptographic module is configured to extract a data payload from a plurality of data frames received through the microcontroller communications interface and encrypt the data payload with an encryption key to generate an encrypted data payload. The IVN transceiver further includes a protocol controller configured to create a data frame to be transmitted through the IVN bus interface from the encrypted data payload.

In an embodiment, the security module includes a stream cipher circuit configured to perform stream cipher encryption and/or stream cipher decryption.

In an embodiment, the stream cipher circuit includes a random number generator configured to generate an encryption keystream, a processing unit configured to encrypt a plaintext message with the encryption keystream to generate a ciphertext stream, and a storage unit configured to store the encryption keystream and/or the ciphertext stream.

In an embodiment, the stream cipher circuit is configured to process a Controller Area Network (CAN) payload without modifying the format of the CAN payload.

In an embodiment, the security module is configured to perform at least one of intrusion detection or intrusion prevention, message encryption or message decryption, packet filtering, and message authentication.

In an embodiment, the security module is configured to perform stream cipher encryption and decryption or block cipher encryption and decryption.

In an embodiment, the security module is configured to perform at least one of frame identification inspection and deep packet inspection.

In an embodiment, the security module is included in the same IC package as the IVN transceiver.

In an embodiment, the IVN transceiver further includes a decoder configured to decode messages received on the microcontroller communications interface.

In an embodiment, the IVN transceiver further includes a transmitter and a receiver.

In an embodiment, an electronic control unit includes the IVN transceiver and a microcontroller, where the microcontroller communications interface of the IVN transceiver is used for communications with the microcontroller.

In an embodiment, the IVN transceiver includes a CAN transceiver.

In an embodiment, a Controller Area Network (CAN) transceiver is disclosed. The CAN transceiver includes a CAN bus interface having a CAN high (CANH) bus interface and a CAN low (CANL) bus interface, a CAN microcontroller communications interface, and a security module connected between the CAN bus interface and the CAN microcontroller communications interface and configured to perform at least one of intrusion detection or intrusion prevention, message encryption or message decryption, packet filtering, and message authentication.

In an embodiment, a method is disclosed. The method for operating an IVN transceiver involves receiving data from a microcontroller using a microcontroller communications interface of the IVN transceiver, performing a security function on the data to generate processed data using a security module of the IVN transceiver connected between the microcontroller communications interface and an IVN bus interface of the IVN transceiver, and transmitting the processed data onto an IVN bus using the IVN bus interface.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4 depicts an embodiment of an ECU that includes a microcontroller and a transceiver that includes a security module.

Throughout the description, similar reference numbers may be used to identify similar elements.

DETAILED DESCRIPTION

Figure 1:
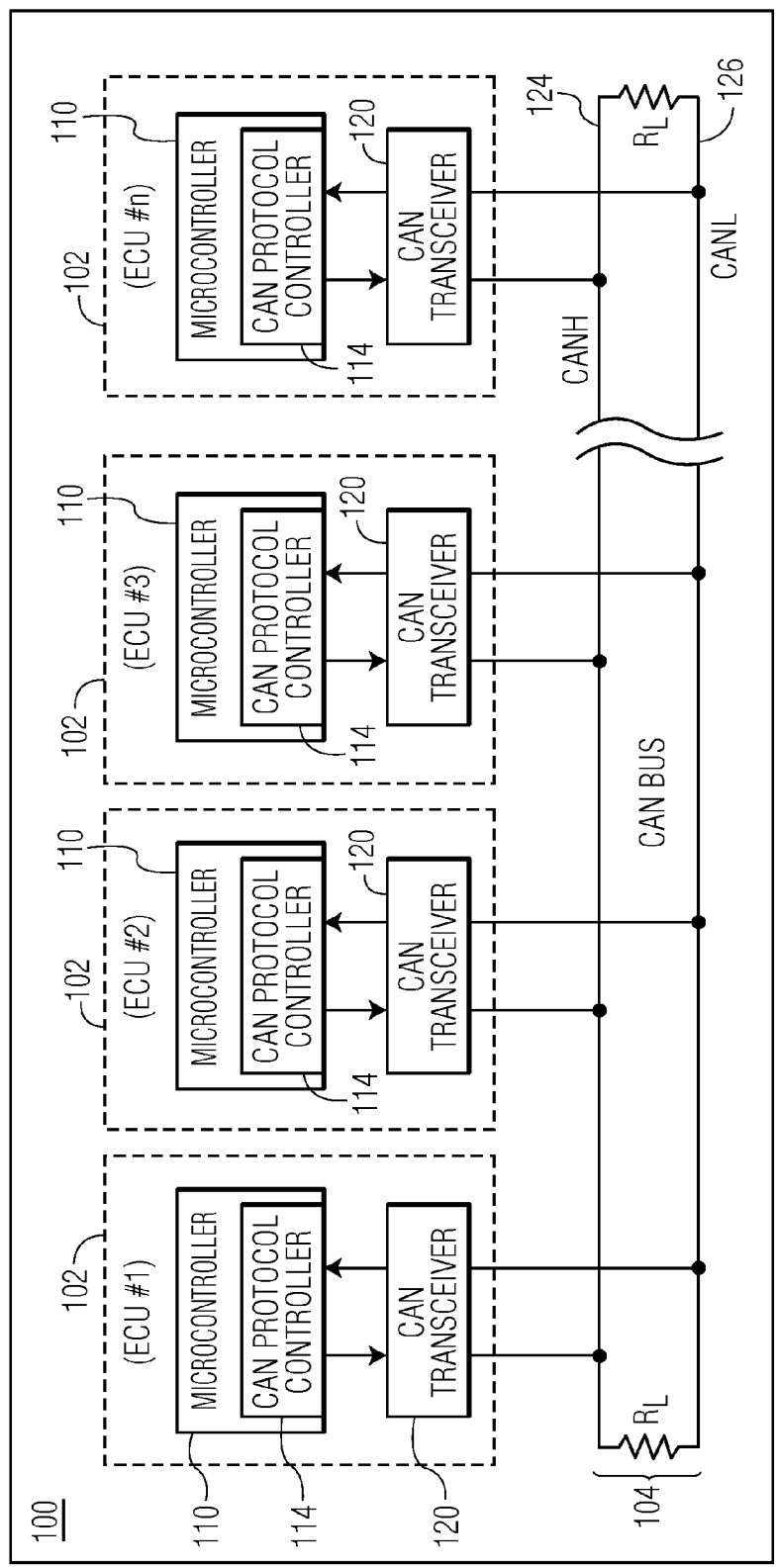
FIG. 1 depicts a CAN network that includes multiple electronic control units (ECUs), each connected to a CAN bus.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Techniques described herein can be applied to any type of in-vehicle networks (IVNs), including a Controller Area Network (CAN), a Local Interconnect Network (LIN), a Media Oriented Systems Transport (MOST) network, a FlexRay™ compatible network, and other types of IVNs. Although in some embodiments a specific type of IVN is described, it should be noted that the invention is not restricted to a specific type of IVN.

FIG. 1 depicts a CAN network 100 that includes multiple ECUs 102, also referred to as "nodes," each connected to a CAN bus 104. The CAN bus is a message-based communications bus protocol that is often used within automobiles. In some vehicles, the CAN bus is the primary automotive networking protocol for power train, backbone bus and body electronics. For example, the CAN bus protocol is used to enable communications between various ECUs, such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," is moving towards standardization in the form of an update of the existing ISO 11898-1 standard. The emerging working draft (WD) of the ISO 11898-1 standard is described in the document, CAN with Flexible Data-Rate, Specification Version 1.0, released Apr. 17, 2012, and is being referred to as ISO 11898-1 WD. Although the network 100 depicted in FIG. 1 is described as a CAN network, the techniques described herein can be applied to any type of IVNs, such as a LIN network or a FlexRay™ compatible network.

In the embodiment of FIG. 1, each ECU 102 includes a microcontroller 110 having an embedded CAN protocol controller 114 and a CAN transceiver 120. The microcontrollers are typically connected to at least one device such as a sensor, an actuator, or some other control device and are programmed to determine the meaning of received messages and to generate appropriate outgoing messages. The microcontrollers, also referred to as host processors or digital signal processors (DSPs), are known in the field. In some embodiments, at least one microcontroller does not include a CAN protocol controller. In these embodiments, the microcontroller directly accesses its corresponding CAN transceiver.

The CAN protocol controllers 114, which can be embedded within the microcontrollers 110 or external to the microcontrollers, implement data link layer operations as is known in the field. For example, in receive operations, a CAN protocol controller stores received serial bits from the transceiver until an entire message is available for fetching by the microcontroller. The CAN protocol controller can also decode the CAN frames according to the standardized frame format. In transmit operations, the CAN protocol controller receives messages from the microcontroller and transmits the messages as serial bits in CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. One or more resistors, RL, may exist between the CANH bus line and the CANL bus line. The CAN bus is known in the field.

Figure 2:
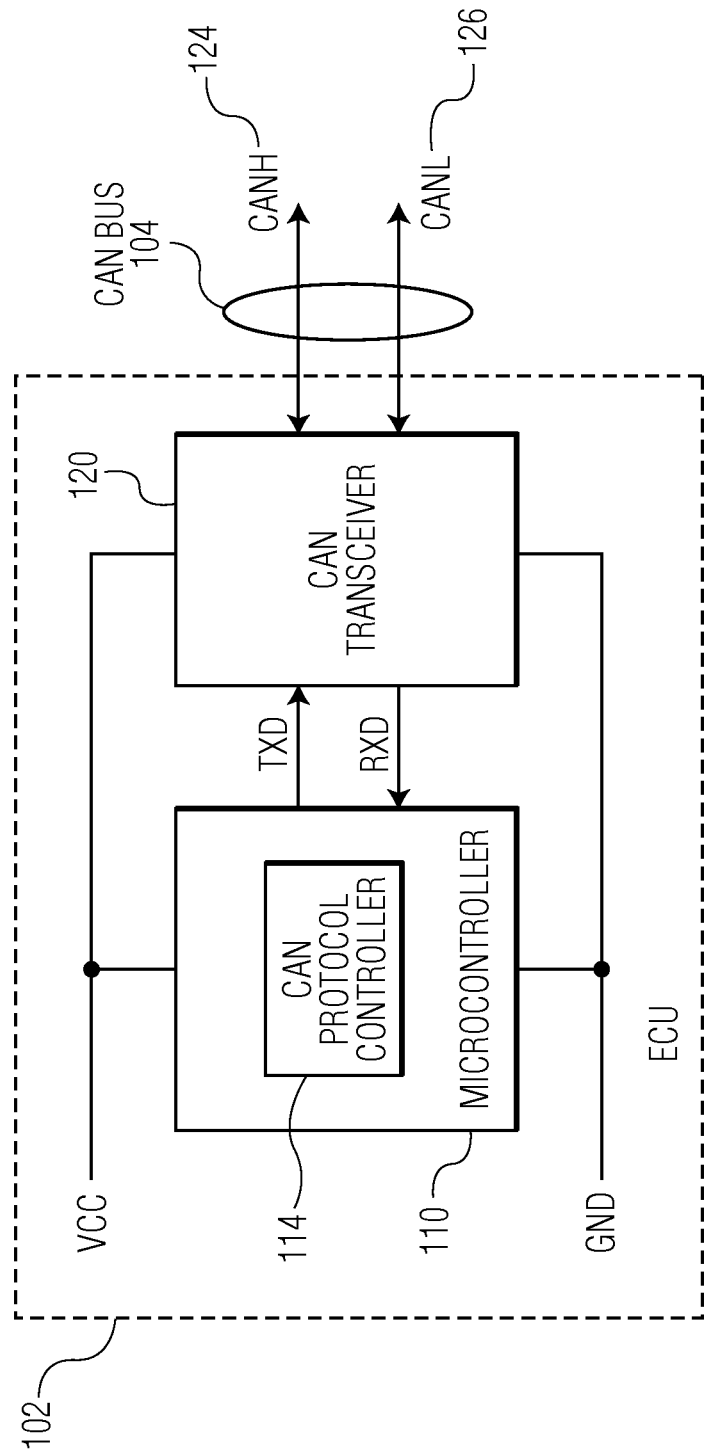
FIG. 2 depicts an expanded view of one ECU from FIG. 1.

FIG. 2 depicts an expanded view of one ECU 102 from FIG. 1. The microcontroller 110 and the CAN transceiver 120 of the ECU are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "CAN classic mode") refers to frames that are formatted according to the ISO 11898-1 standard and "CAN FD mode" refers to frames that are formatted according to the emerging ISO 11898-1 WD standard, or an equivalent thereof. The emerging ISO 11898-1 WD standard is described in the document, CAN with Flexible Data-Rate, Specification Version 1.0, released Apr. 17, 2012, which is incorporated by reference herein.

Figure 3A:
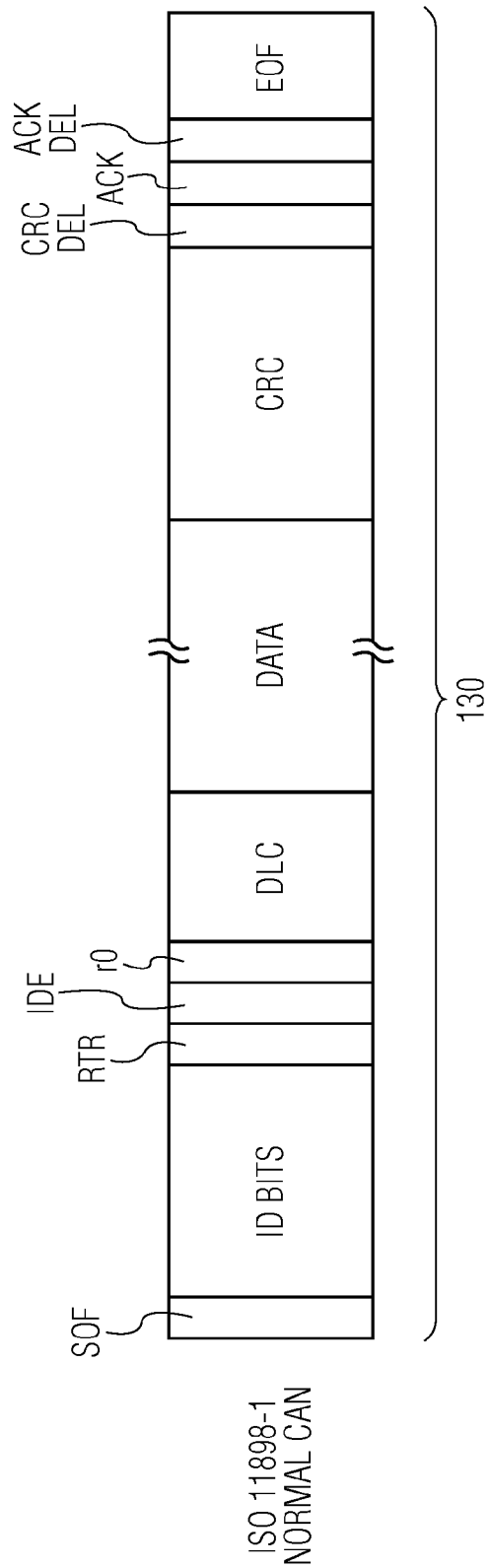
FIG. 3A depicts the format of an ISO 11898-1 frame that is used in CAN normal mode.
Figure 3B:
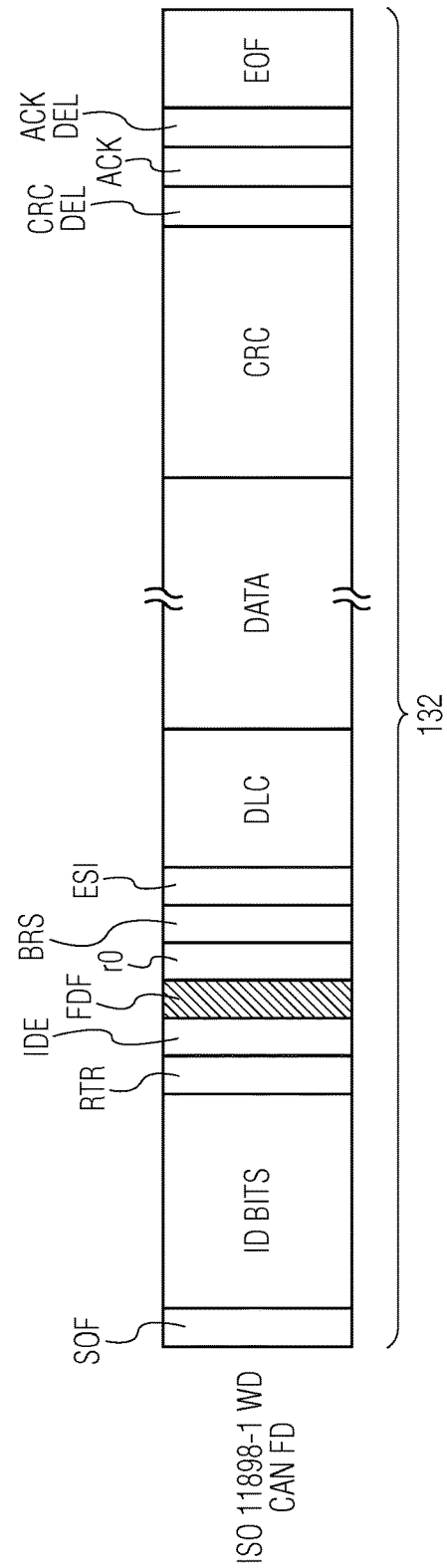
FIG. 3B depicts the format of an ISO 11898-1 WD frame that is used in CAN FD mode.

FIG. 3A depicts the format of an ISO 11898-1 frame 130 (in the classic base frame format (CBFF)) that is used in CAN normal mode and FIG. 3B depicts the format of an ISO 11898-1 WD frame 132 (in the FD base frame format) that is used in CAN FD mode. The fields of the CAN normal mode and CAN FD mode frames are defined as follows:

| | |
|---|---|
| SOF | Start of Frame (always dominant) |
| ID | Bits Identifier Bits, defining the message content |
| RTR | Remote transmission Request |
| IDE | ID Extension |
| r0 | Reserved Bit 0 (replaced by FDF in the CAN FD format) |
| FDF | FD Format (this is the bit distinguishing the frame formats) |
| BRS | Baud Rate Switch |

-continued

| | |
|---|---|
| ESI | Error State Indicator |
| DLC | Data Length Code |
| Data | Data Bytes |
| CRC | Cyclic Redundancy Check |
| CRC Del | CRC Delimiter (always recessive) |
| ACK | Acknowledge |
| ACK Del | Acknowledge Delimiter |
| EOF | End Of Frame |

Current vehicles are complex cyber-physical devices made of mechanical parts, tens of electronic control units and millions of software line of codes. The arrival of the Internet of Things (IoT) with connected vehicles being mapped as a thing in the connected world can lead to serious cybersecurity threats, arising from the increased possibility of hacking of in vehicle electronics and IVNs used for in vehicle networking. Securing IVNs from cyberattacks is a difficult task as there are many miniature, highly resource constrained devices with very limited computational power, memory capabilities, and also there are limitations associated with deploying security primitives on IVN protocols. For example, although the CAN protocol offers cyclic redundancy check (CRC) mechanisms, which provide protection against transmission errors, the CAN protocol generally does not provide much support for implementing cybersecurity features as offered by protocols such as Ethernet, WIFI, etc. Similarly, other IVN protocols such as the LIN protocol, the MOST protocol, and FlexRay™ also have cybersecurity vulnerabilities that can be exploited by cyberattacks.

Modifying existing IVN protocols to include cyber security mechanisms poses several challenges, which include a limited data payload that does not meet the minimum size of block ciphers, limited data rates, and increased risk of delaying real time response of safety critical systems within vehicles. For example, the data payload of the CAN protocol typically has a length of 8 Bytes, which is below the minimum size of block ciphers of 16 Bytes. Some techniques for providing security in IVNs involve changing the host microcontrollers (MCUs) of the ECUs to include modules to perform security functions. However, the requalification effort and modifications in the hardware and software associated with such a change in the MCUs can inhibit adoption. Additionally, such an approach is typically limited to certain types of MCUs (e.g., 32 bit MCUs). Pure software based security techniques (e.g., intrusion detection or cryptographic primitives) running on the application core of an MCU are slow in execution and also put a significant load on the host MCU resources. An intrusion detection system (IDS) or an intrusion protection system (IPS) detects cyberattacks by monitoring both the incoming and outgoing network packets based on preset rules and policies that distinguish a normal packet from a malicious packet. However, the software based security techniques can increase the computational load and reduce the performance of host MCUs. In addition, an implementation of security software, such as hosting of security primitives (e.g., IDS/IPS and cryptographic) on the software stack needs modifications in the hardware and the software architecture of MCUs, which can increase component cost and delay time to market. Further, safety standards for automotive MCUs are stringent and sacrificing safety standards in favor of security is not acceptable.

In accordance with an embodiment of the invention, an IVN transceiver includes an IVN bus interface, a microcontroller communications interface, and a security module connected between the IVN bus interface and the microcontroller communications interface and configured to perform a security function. Including security modules in IVNs allows security features to be built into transceivers of ECUs. Security features can be built into transceivers of ECUs in hardware (e.g., dedicated circuits in an ASIC), software (e.g., software code that can be executed by a programmable core or a processor), or a combination of hardware and software. Compared to modifying the MCUs of ECUs to include security features, building security features into transceivers of ECUs can protect the integrity and authenticity of all of the packets that traverse IVNs. In addition, compared to modifying the MCUs of ECUs to include security features, building security features into transceivers of ECUs has little or no impact on the software architecture of host application cores in the MCUs and relieves the MCUs from performing security tasks, which can accelerate the MCU execution process. Further, building security features into transceivers of ECUs enables isolation of hardware resources used for cybersecurity from the MCU hardware resources used for the application processing.

FIG. 4 depicts an embodiment of an ECU 402 that includes a microcontroller 410 and a transceiver 420 that includes a security module 408 configured to perform a security function. The transceiver may be any type of IVN transceiver, such as a CAN transceiver, a LIN transceiver, a MOST network transceiver, a FlexRay™ compatible transceiver, or another type of IVN transceiver. The IVN transceiver also includes a microcontroller communications interface 406 and an IVN bus interface 444. The microcontroller communications interface is used for communications between the microcontroller and the transceiver. The IVN bus interface is used for the communications between the transceiver and the IVN bus. With the security module implemented in the transceiver, cyberattacks can be addressed before the MCUs (end nodes in the IVN) are impacted, which results in faster response to the cyberattacks. In some embodiments, the security module is implemented in the same substrate as the transceiver. In an embodiment, the security module is included in the same IC package as the transceiver.

The security module 408 can perform a variety of security features/functions. Examples of the security features that can be performed by the security module include, without being limited to, stream ciphering, packet filtering (e.g., frame identification (ID) inspection and deep packet inspection), traffic control (e.g., to avoid flooding and denial of service type of attacks), authentication/authorization (e.g., ECU authentication and message authentication), intrusion detection/intrusion prevention (IDS/IPS), and message encryption or message decryption. The security module can be implemented in hardware, software (e.g., computer instructions stored on a computer-readable medium), or a combination of hardware and software.

Figure 5:
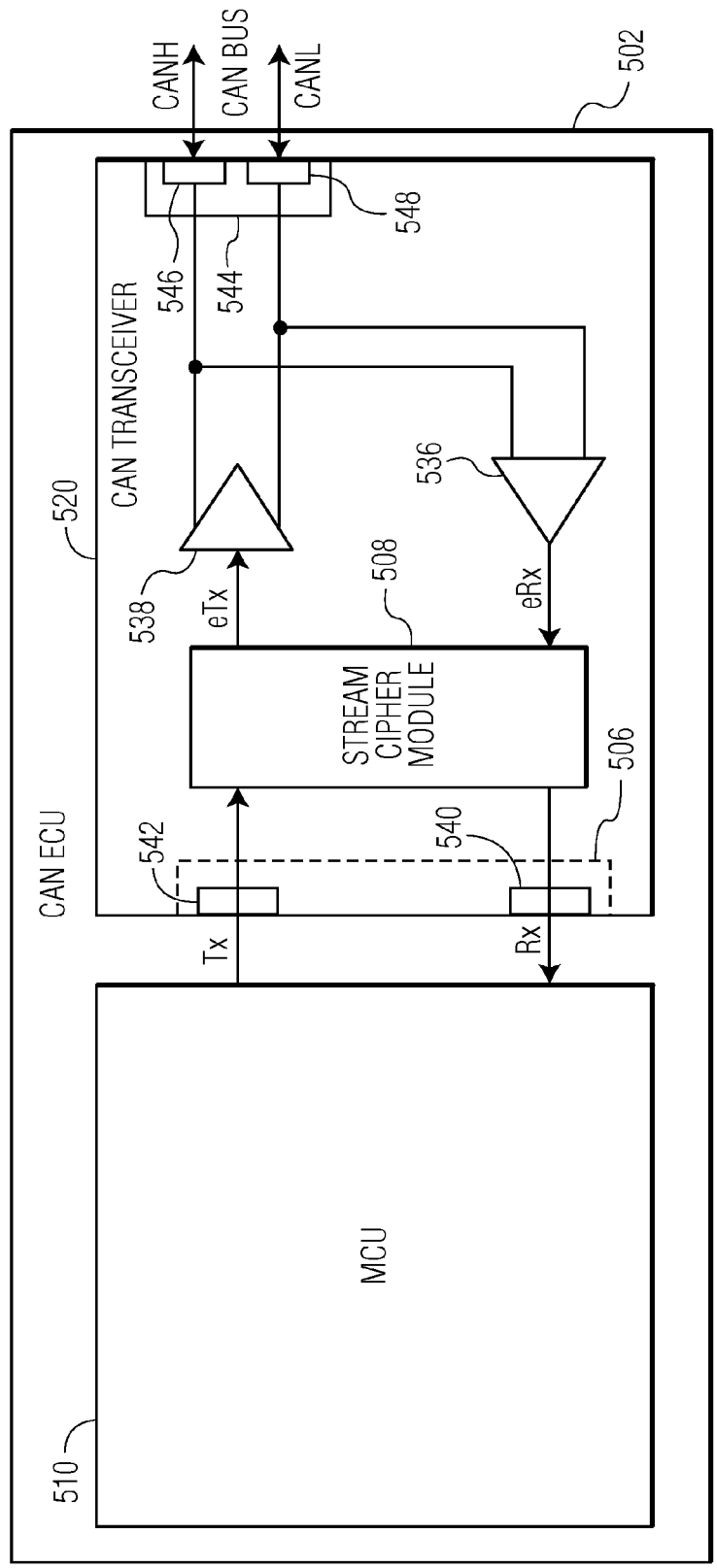
FIG. 5 depicts an embodiment of a CAN ECU that includes a microcontroller and a CAN transceiver implemented in an application-specific integrated circuit (ASIC) that includes a stream cipher module.

FIG. 5 depicts an embodiment of a CAN ECU 502 that includes a microcontroller 510 and a CAN transceiver 520 implemented as an ASIC that includes a stream cipher module 508. As shown in FIG. 5, the CAN transceiver also includes a receiver 536, a transmitter 538, a microcontroller communications interface 506 having an RX interface 540 and a TX interface 542, and a CAN bus interface 544 having a CANH bus interface 546 and a CANL bus interface 548. CAN traffic that is received at the CAN bus interface is processed by the stream cipher module and passed to the RX interface via the receiver and CAN traffic that is received at the TX interface is processed by the stream cipher module and transmitted out the CAN bus interface via the transmitter. Examples of the stream cipher module include, without being limited to, Trivium stream cipher modules, RC4 stream cipher modules, and Advanced Encryption Standard (AES) stream cipher modules, each of which can be implemented in hardware circuits within the CAN transceiver. In the embodiment depicted in FIG. 5, the stream cipher module converts one symbol of plaintext directly into a symbol of ciphertext. Each symbol/bit of the plaintext can be encrypted one at a time with the corresponding digit of a pseudorandom cipher digit stream (keystream) to generate a digit of the ciphertext stream.

The hardware-based stream cipher module 508 depicted in FIG. 5 can be produced more cost-efficiently than a software-based stream cipher. In addition, compared to a block cipher that encrypts a group of plaintext symbols as one block, the stream cipher module can work with individual symbols/bits of a plaintext message. For example, a block cipher usually processes data blocks of 16 bytes, which is 2 times the size of the CAN payload (8 bytes), and consequently, needs the modification of the format of the CAN payload. The stream cipher module can directly process the CAN payload (e.g., 8 bytes) without modifying the format of the CAN payload.

Figure 6:
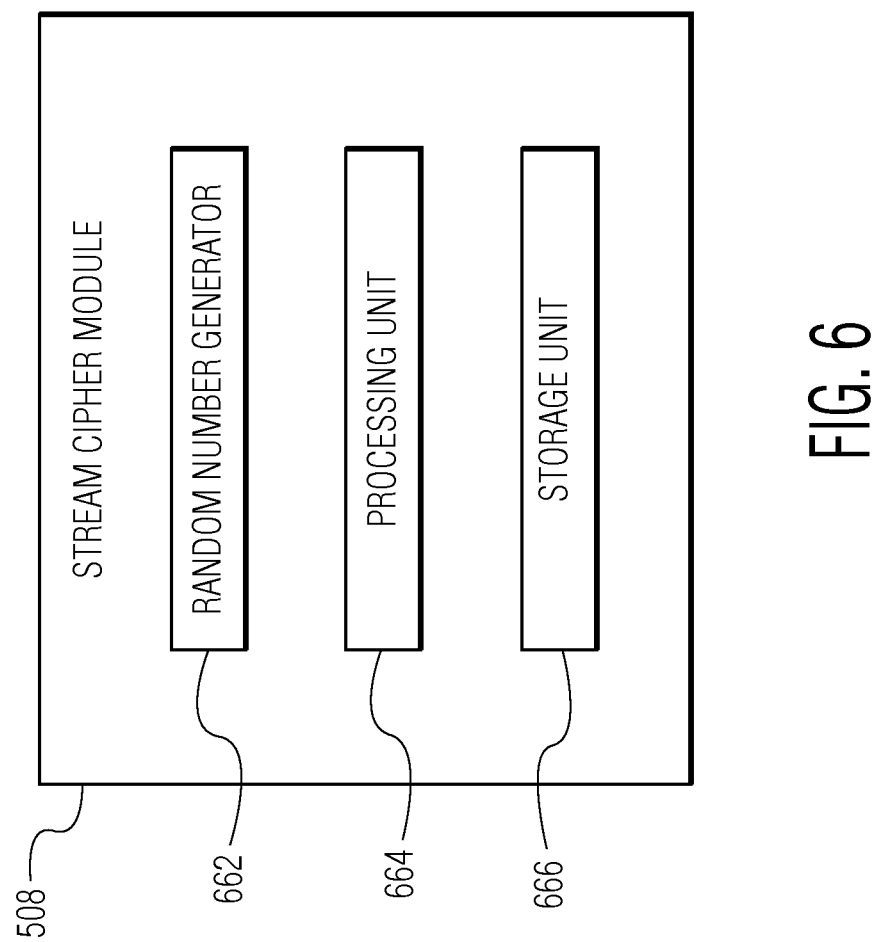
FIG. 6 depicts a functional block diagram of an embodiment of the stream cipher module depicted in FIG. 5.

FIG. 6 depicts a functional block diagram of an embodiment of the stream cipher module 508 depicted in FIG. 5. In the embodiment depicted in FIG. 6, the stream cipher module 508 includes a random number generator 662 configured to generate an encryption keystream, a processing unit 664 configured to encrypt a plaintext message with the encryption keystream to generate a ciphertext stream, and a storage unit 666 configured to store the encryption keystream and/or the ciphertext stream. In an embodiment, the random number generator, the processing unit, and the storage unit are implemented in hardware on the same packaged semiconductor device as the CAN transceiver 520. The random number generator can be implemented with dedicated logic circuits. The processing unit can be implemented with logic circuits, such as XOR gates, AND gates, and shifter registers. In some embodiments, the processing unit includes three shift registers, seven XOR gates, and one AND gate. The storage unit can be implemented with memory circuits, such as non-volatile memory. In an embodiment, the random number generator is implemented in hardware with around 5,000 logic gates, the processing unit is implemented in hardware with around 1,750 to 3,500 logic gates, and the storage unit is implemented in hardware with around 5,000 logic gates.

Figure 7:
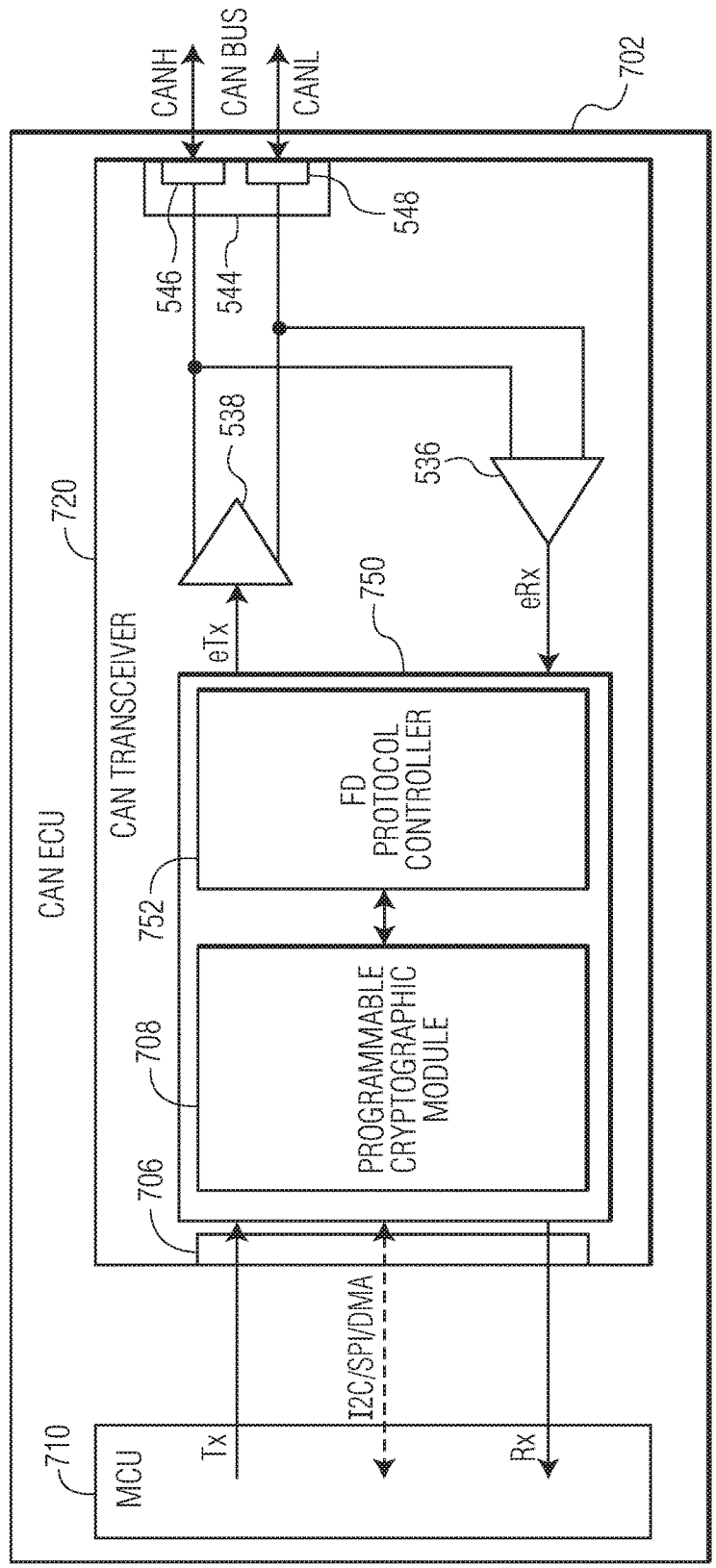
FIG. 7 depicts an embodiment of a CAN ECU that includes a microcontroller and a transceiver that includes a programmable cryptographic module configured to execute security software programs.

FIG. 7 depicts an embodiment of a CAN ECU 702 that includes a microcontroller 710 and a transceiver 720 that includes a programmable cryptographic module 708 configured to execute software-based security programs. The programmable cryptographic module 708 can be reprogrammed (e.g., reflashed) to execute various software-based security programs.

Digital data generated by the microcontroller needs to be framed in accordance with the format of an IVN protocol before the digital data can be transmitted on an IVN. However, the limited payload of 8 bytes as offered by the CAN protocol format makes the deployment of security techniques challenging. For example, message integrity deployment typically needs a message authentication code of 16 bytes, which is 2 times the size of the CAN payload. Consequently, message integrity deployment in a CAN transceiver would need message authentication code (MAC) calculation for the wider number of messages, such as either MAC truncation or migration to wider payload packets. For example, the transceiver could remove the identifiers of the original frame format and recalculate the identifiers, resulting in additional steps and an increased for processing power. In the CAN ECU depicted in FIG. 7, the increased processing power problem is addressed by the provision of a programmable cryptographic module 708 and a flexible data rate (FD) protocol controller 752 in a processing unit 750 of the transceiver. In an embodiment, the programmable cryptographic module and the FD protocol controller repackage the cipher text into wider payload (e.g., 64 bytes packets). As shown in FIG. 7, the CAN transceiver also includes the receiver 536, the transmitter 538, a microcontroller communications interface 706, and the CAN bus interface 544 having the CANH bus interface 546 and the CANL bus interface 548. In some embodiments, the microcontroller communications interface has an RX interface and a TX interface to communicate with a protocol controller of the MCU. Alternatively, if the protocol controller in the MCU is disabled or if the MCU does not include a protocol controller, the microcontroller communications interface may be, for example, a Serial Peripheral Interface (SPI)/Inter-Integrated Circuit (I2C)/Direct Memory Access (DMA) interface.

The programmable cryptographic transceiver 720 enables the execution of security software to be isolated from the MCU 710. The separate execution environment with the provision of a separate security core in the transceiver, with a separate storage area which is only accessed by the security core, which provides a higher level of isolation compared to a dual core MCU approach. Specifically, in a dual core MCU approach, a separate core is provided and the storage area and the bus structure is shared between the two cores, which needs an instruction scheduler (e.g., scheduling security routines and application routines between the dual cores) and a memory protection unit to ensure that only the allocated core is allowed to access its own dedicated data. However, the ECU 702 eliminates this need because of the complete isolation enabled by the provision of separate cores and separate storage areas. In addition, compared to the dual core MCU approach, implementing the programmable cryptographic module 708 in the transceiver is a cost-effective way of implementing security in a CAN ECU.

Application software running on an MCU generates digital data, which is typically stored in transmit buffers within the MCU. In embodiments in which the microcontroller includes a protocol controller 814 (as shown in the CAN ECU 802 of FIG. 8) to organize the digital data in the form of frames (Tx, Rx) to be transmitted to the CAN transceiver, the transceiver includes a CAN decoder 870 in a processing unit 850 for extracting the data payload field (8 bytes) from the CAN frames received through a TX/RX interface 806 to create a longer message (e.g., 64 bytes).

Figure 9:
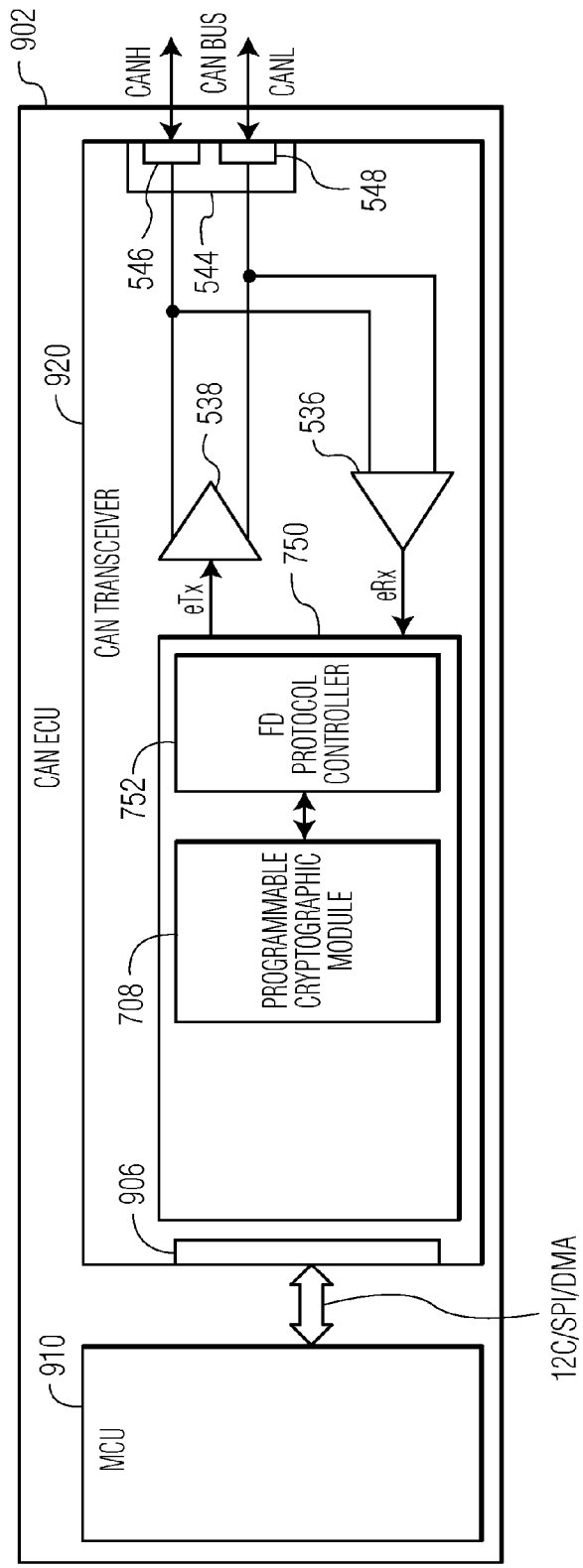
FIG. 9 depicts an embodiment of the CAN ECU depicted in FIG. 7 without a CAN decoder.

The data extraction step can be avoided if the protocol controller 814 of the MCU 810 is disabled or the MCU 910 does not include a protocol controller (as shown in the CAN ECU 902 of FIG. 9). In embodiments in which the microcontroller does not include a protocol controller, the microcontroller directly communicates with the programmable cryptographic module of the transceiver through an interface 906 (e.g., an I2C/SPI/DMA interface), consequently, a CAN decoder is not needed in the transceiver. In such embodiments, the transceiver calculates a CRC, creates identifier bits and frames the encrypted message (cipher text) in the CAN FD format. The encrypted CAN FD frames are converted into analog information that is transmitted over the CAN bus.

Figure 8:
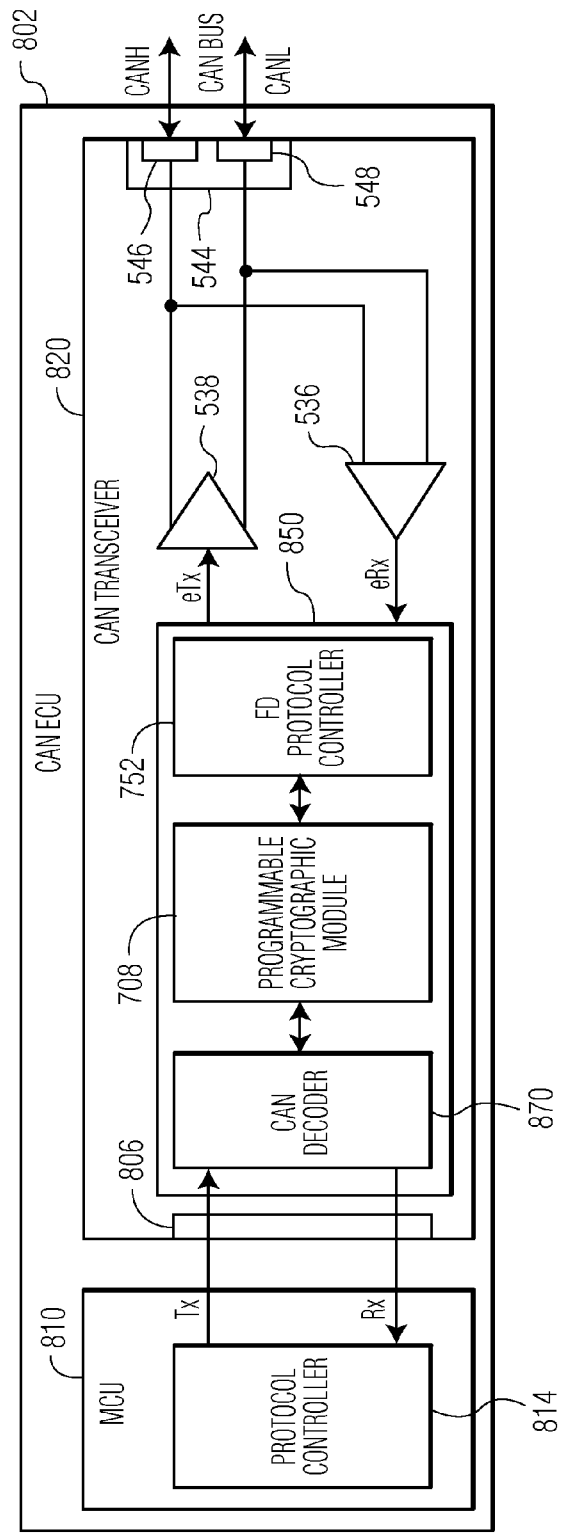
FIG. 8 depicts an embodiment of the CAN ECU depicted in FIG. 7 with a CAN decoder.
Figure 10A:
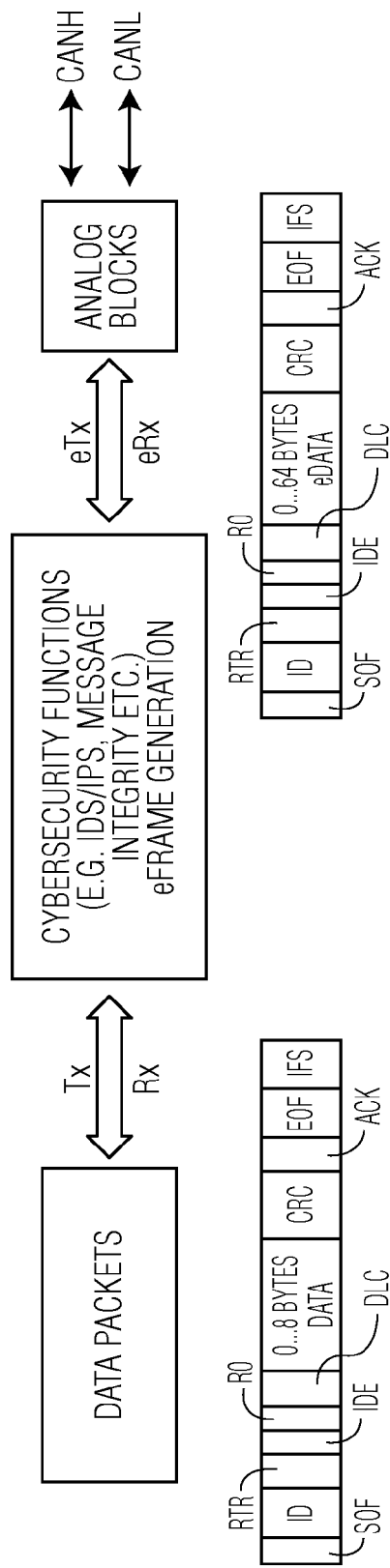
FIGS. 10A and 10B illustrate some security operations that are performed by the CAN ECUs depicted in FIGS. 8 and 9, respectively.
Figure 10B:
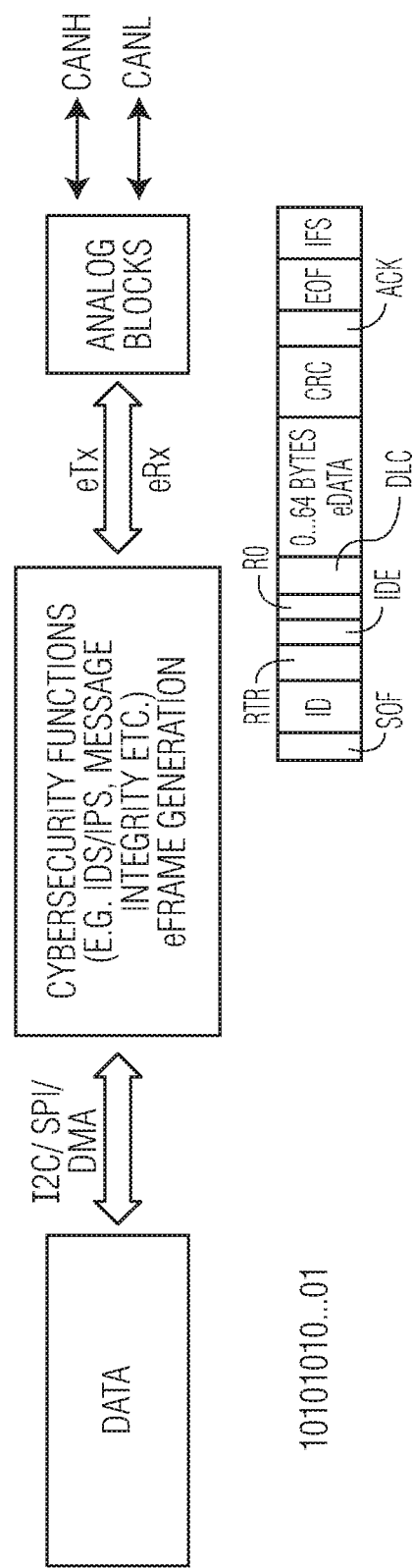

FIGS. 10A and 10B illustrate security operations that can be performed by the CAN ECUs 802, 902 depicted in FIGS. 8 and 9, respectively. In the operations illustrated in FIG. 10A, a CAN payload of 8 bytes, received through the TX/RX interface 806, is extracted by the CAN decoder 870 depicted in FIG. 8 to create a data frame of 64 bytes and the 64 byte data frame is processed in the programmable cryptographic module 708 of FIG. 8. In the operations shown in FIG. 10B, a CAN payload of 8 bytes received through the I2C/SPI/DMA interface 906 is processed in the programmable cryptographic module 708 of FIG. 9.

Figure 11:
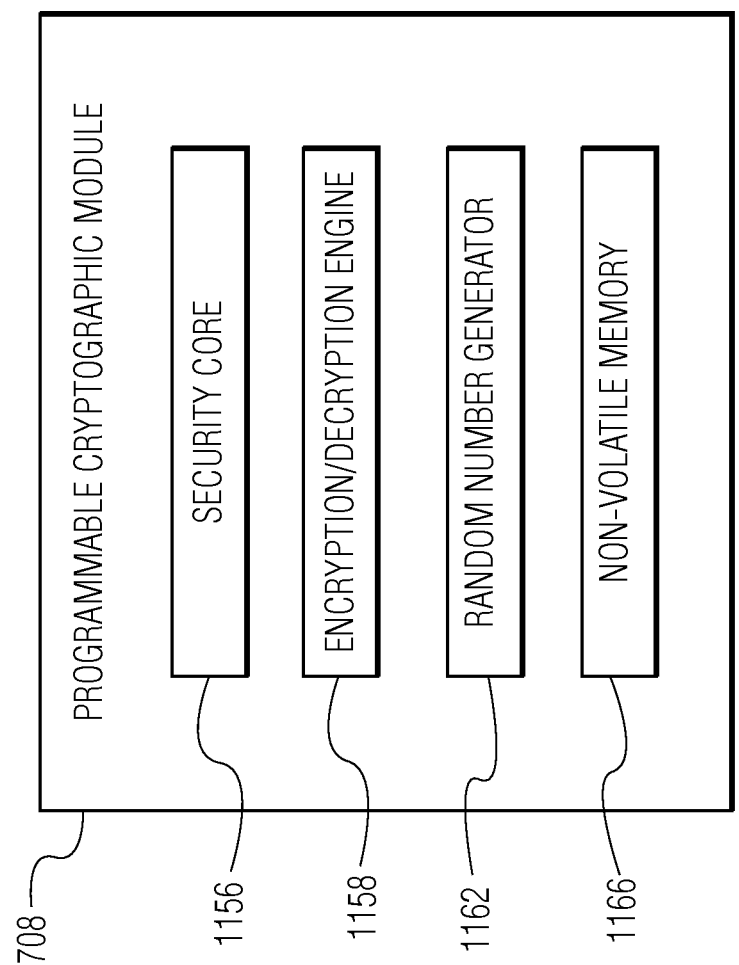
FIG. 11 depicts a functional block diagram of an embodiment of the programmable cryptographic module depicted in FIG. 7.

FIG. 11 depicts a functional block diagram of an embodiment of the programmable cryptographic module 708 depicted in FIGS. 7-9. In the embodiment depicted in FIG. 11, the programmable cryptographic module includes a security core 1156 configured to execute security software routines, a random number generator 1162 configured to generate encryption key, an encryption/decryption engine 1158 configured to perform message encryption/decryption using the encryption key, and a non-volatile memory (NVM) 1166 configured to provide secure storage of cryptographic information, which includes keys used for cryptographic operations and/or a set of policies for intrusion detection/prevention. In an embodiment, the random number generator is a true random number generator (TRNG). In an embodiment, the NVM is a secure non-volatile memory (SNVM).

The security core 1156 may include register and memory circuits for the execution of microcode that is configured to implement security software (e.g., IDS/IPS software, cryptography software). The security core can be used to execute a variety of security software features. Examples of the security software features that can be performed by the security core include, without being limited to, stream ciphering, packet filtering (e.g., frame identification (ID) inspection and deep packet inspection), traffic control (e.g., to avoid flooding and denial of service type of attacks), authentication/authorization (e.g., ECU authentication and message authentication), intrusion detection/intrusion prevention (IDS/IPS), and message encryption or message decryption. The security core can be implemented with a processor, such as a general purpose processor or a central processing unit (CPU).

The encryption/decryption engine 1158 is configured to perform various types of encryption techniques, such as AES, Data Encryption Standard (DES), and the International Data Encryption Algorithm (IDEA). In some embodiments, the encryption engine is a block cipher, which may be an AES block cipher, a 3DES block cipher, an ECC block cipher, or a SHA block cipher. In such embodiments, the encryption engine can create a block output of data of a certain length (e.g., 128 bits, 192 bits and 256 bits) depending on the selection of encryption engine. The encryption/decryption engine can also perform message authentication and message integrity check. The keys needed for authentication (message integrity, Ks) and encryption (Ke) can be the same or they can be different. The keys needed for the encryption can be generated internally by the random number generator or can be securely provisioned in the NVM of the CAN transceiver.

Figure 12:
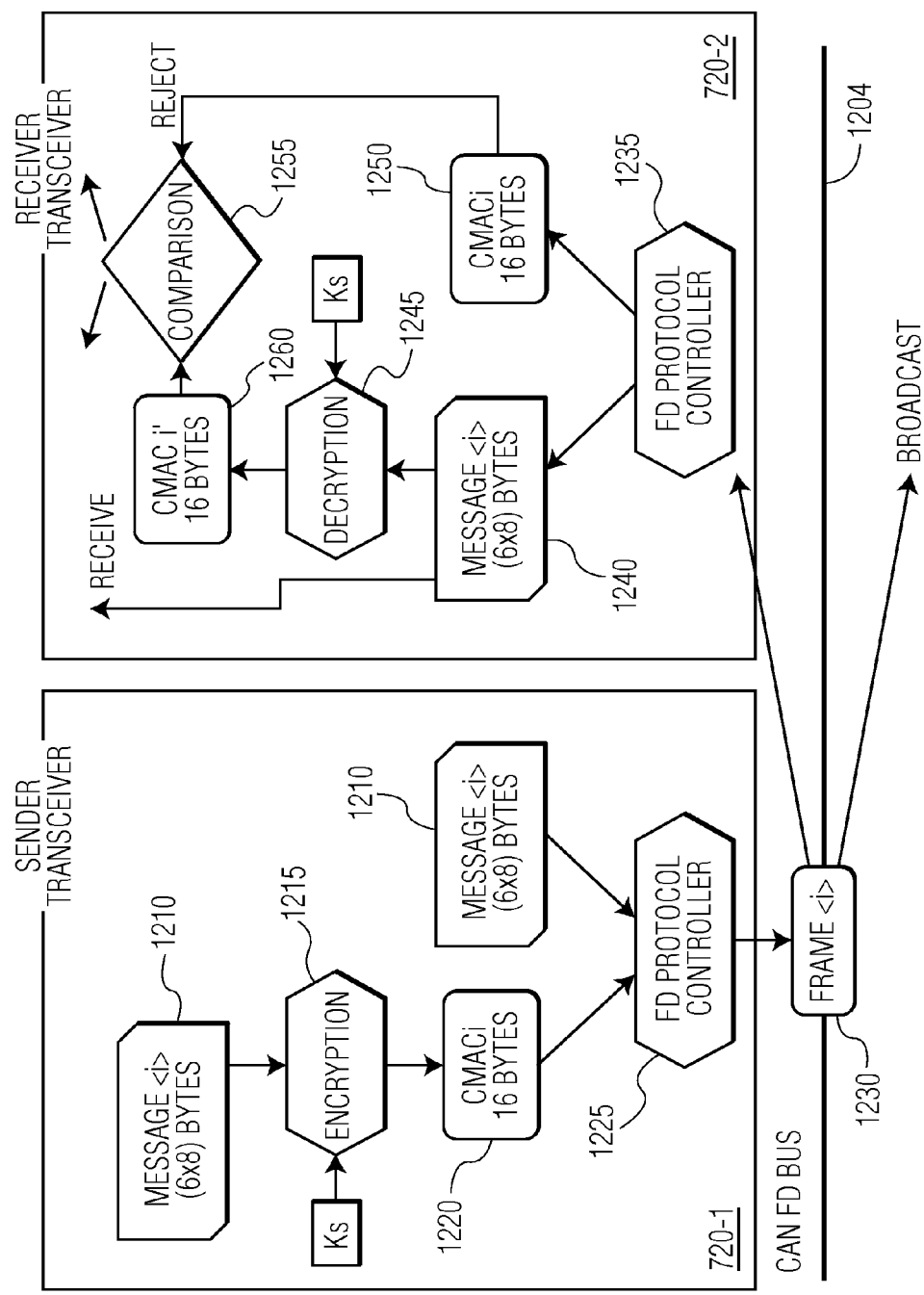
FIG. 12 illustrates some message integrity operations that are performed by CAN transceivers.
Figure 13:
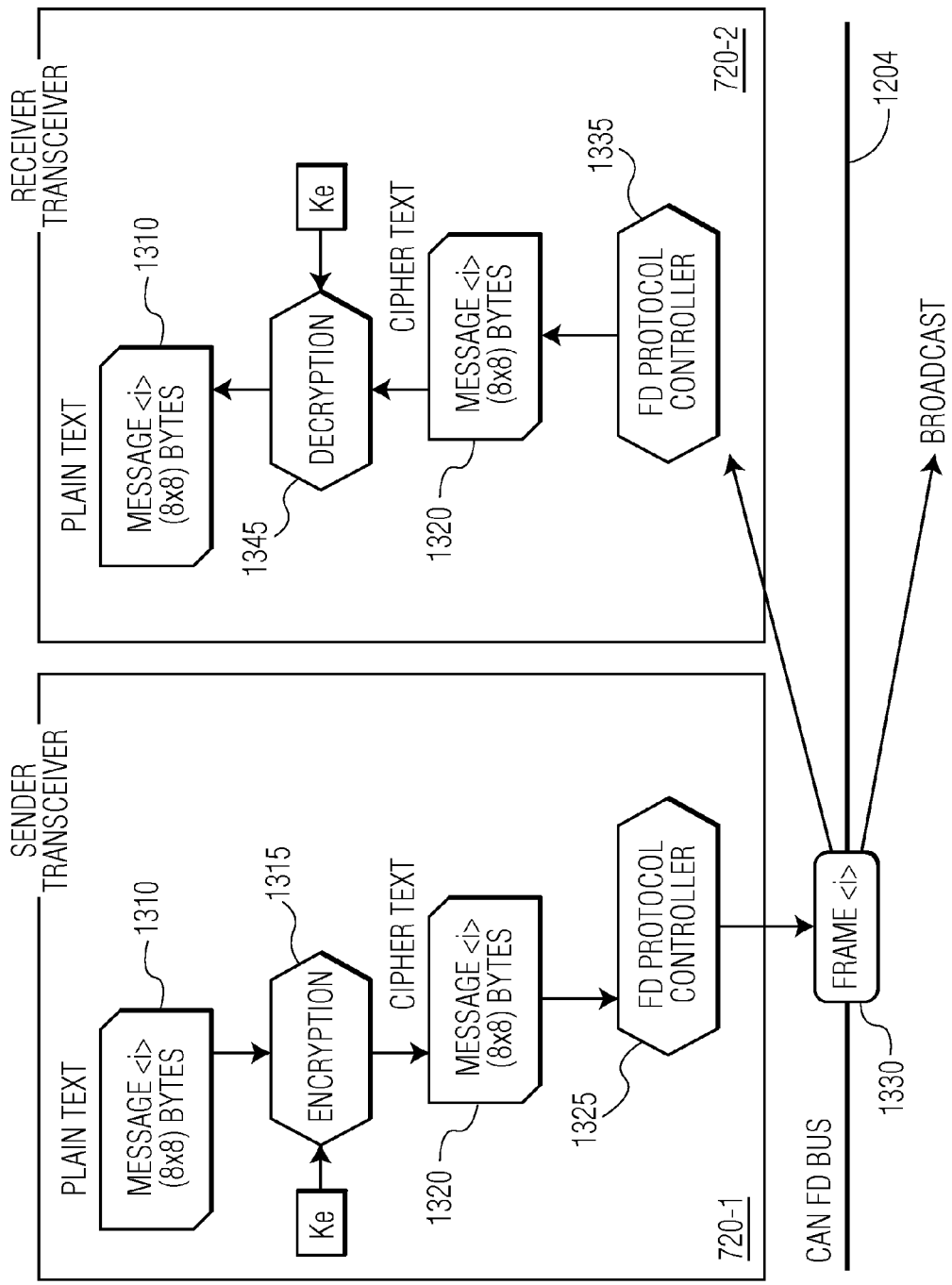
FIG. 13 illustrates some encryption/decryption operations that are performed by CAN transceivers.

Example operations of the programmable cryptographic module 708 of FIG. 11 are described with reference to FIGS. 12 and 13. FIG. 12 illustrates message integrity operations that are performed by programmable cryptographic modules 708 within CAN transceivers 720-1, 720-2 and FIG. 13 illustrates encryption/decryption operations that are performed by programmable cryptographic modules 708 within CAN transceivers 720-1, 720-2.

With reference to FIG. 12, message integrity operations are performed by the programmable cryptographic modules 708 of a sender transceiver 720-1 and a receiver transceiver 720-2. In the case that the corresponding MCU 710 of the sender transceiver 720-1 includes a protocol controller, the standard CAN data packets (8 bytes payload) generated by the protocol controller are transmitted to the sender transceiver 720-1 through a Tx/Rx interface. The CAN data payload is extracted from the packets by the programmable cryptographic module 708 of the sender transceiver 720-1. In the embodiment depicted in FIG. 12, a message to be encrypted (i.e., the plain text) 1210 includes the extracted data payload of 6 CAN frames. Alternatively, if the protocol controller in the corresponding MCU is disabled or if the corresponding MCU does not include the protocol controller, the data generated by the application software of the corresponding MCU is directly transmitted to the sender transceiver 720-1 through a SPI/I2C/DMA interface.

At step 1215, the encryption/decryption engine 1158 in the programmable cryptographic module 708 of the sender transceiver 720-1 utilizes the plain text and the authentication key (Ks) to create a cipher text. For example, the encryption/decryption engine may include an AES-128 or other type of advance encryption system, which operates in a cipher block chaining (CBC) mode to generate a Cipher-based Message Authentication Code (CMAC) digest 1220. In the embodiment depicted in FIG. 12, the CMAC digest has 128 bits while the plain text (6×8 Bytes of CAN data payload) has 384 bits.

The plain text 1210 (including the data payload of 6 frames, 48 Bytes, 384 bits) is combined with the CMAC digest 1220 (16 Bytes, 128 bits), and are then reframed by a FD (CAN Flexible Data rate) protocol controller 752 of the sender transceiver 720-1, at step 1225. The FD protocol controller computes a new CRC and other relevant identifier bits and creates a new message integrity feature enabled CAN FD frame 1230.

The CAN FD frame 1230 is then transmitted over the CAN BUS 1204 via an analog block that converts the frame into an analog signal. At the receiver transceiver 720-2, a corresponding analog block converts the analog signal back into the digital CAN FD frame.

When an encrypted frame is received by the receiver transceiver 720-2, the FD protocol controller 752 of the receiver transceiver 720-2 checks the CRC, at step 1235. If the FD protocol controller of the receiver transceiver 720-2 determines that the frame does not contain transmission related errors, the frame, which is divided into a plain text message 1240 and a CMAC digest 1250, is passed onto the programmable cryptographic module. Otherwise, the frame is rejected and a rejection message can be sent by to the sender transceiver. The encryption/decryption engine 1168 of the receiver transceiver 720-2 decrypts the digest to check for the message integrity with the help of same key used for encryption (assuming the keys have been securely trust provisioned in the transceiver) to generate a CMAC digest 1260, at step 1245. If the verification fails (e.g., by comparing the CMAC digest 1260 with the CMAC digest 1250), the data message is discarded and an 'Error Signal' is generated, at step 1255. If the corresponding MCU 710 of the receiver transceiver 720-2 includes a protocol controller, the data is reformulated into the CAN packets. Alternatively, if the controller in the corresponding MCU is disabled or if the corresponding MCU does not include the protocol controller, the extracted plain text data is transferred directly to the corresponding MCU through a SPI/I2C/DMI interface.

With reference to FIG. 13, message encryption/decryption operations are performed by programmable cryptographic modules 708 of a sender transceiver 720-1 and a receiver transceiver 720-2. If the corresponding MCU 710 of the sender transceiver 720-1 includes a protocol controller, the standard CAN data packets (8 Bytes payload) generated by the protocol controller are transmitted to the sender transceiver through a Tx/Rx interface. The CAN data payload is extracted from the packets by the programmable cryptographic module. In the embodiment depicted in FIG. 13, a message to be encrypted (i.e., the plain text) 1310 includes the extracted data payload of 8 CAN frames. Alternatively, if the protocol controller in the MCU is disabled or if the MCU does not include the protocol controller, the data generated by the application software is directly submitted to the sender transceiver 720-1 through a SPI/I2C/DMA interface.

At step 1315, the encryption/decryption engine (e.g., 3DES/AES/ECC encryption engine) 1158 embedded in the programmable cryptographic module 708 of the sender transceiver 720-1 utilizes the plain text and the encryption key (Ke) to create a cipher text 1320. For example, the encryption/decryption engine may include an AES-128 or other type of advanced encryption system, which operates in a cipher block chaining (CBC) mode to create a 64-byte cipher text.

At step 1325, the 64 Bytes (512 bits) of cipher text data is then framed by the FD (CAN Flexible Data rate) protocol controller 752 of the sender transceiver 720-1, which computes a new CRC, other relevant identifier bits and creates a new encrypted CAN FD frame 1330.

The encrypted CAN FD frame 1330 is then transmitted over the CAN BUS 1204 via an analog block that converts the frame into analog signal. At the receiver transceiver, a corresponding analog block converts the analog signal back to the digital CAN FD frame.

When an encrypted frame is received by the receiver transceiver 720-2, the FD protocol controller 752 of the receiver transceiver checks the CRC at step 1335. If the FD protocol controller determines that the frame does not contain transmission related errors, the cipher text 1320 is recovered and passed to the programmable cryptographic module 708 of the receiver transceiver 720-2. Otherwise, the frame is rejected and a rejection message can be sent by to the sender transceiver 720-1. The encryption/decryption engine 1158 of the receiver transceiver 720-2 decrypts the encrypted message (assuming the keys have been securely trust provisioned in the transceiver) and generates the plain text 1310, at step 1345.

If the corresponding MCU 710 of the receiver transceiver 720-2 includes a protocol controller, the data is reformulated into CAN packets. Alternatively, if the controller in the corresponding MCU is disabled or if the corresponding MCU does not include a protocol controller, the extracted plain text data is transferred directly to the corresponding MCU through, for example, a SPI/I2C/DMI interface.

Message integrity operations and message encryption/decryption operations can also be combined together to achieve authentication and confidentiality. In an embodiment, the programmable cryptographic module 708 encrypts a message and creates a CMAC digest from the encrypted message. In another embodiment, a CMAC digest is created from the plaintext message and then the plaintext message, excluding CMAC is encrypted to generate cipher text (encrypted message). The plaintext's CMAC and the cipher text are combined together as a payload of the CAN FD frame. In yet another embodiment, a CMAC is generated from the plaintext, and then the plaintext and CMAC are encrypted together to produce an encrypted payload for CAN FD frame.

Figure 14:
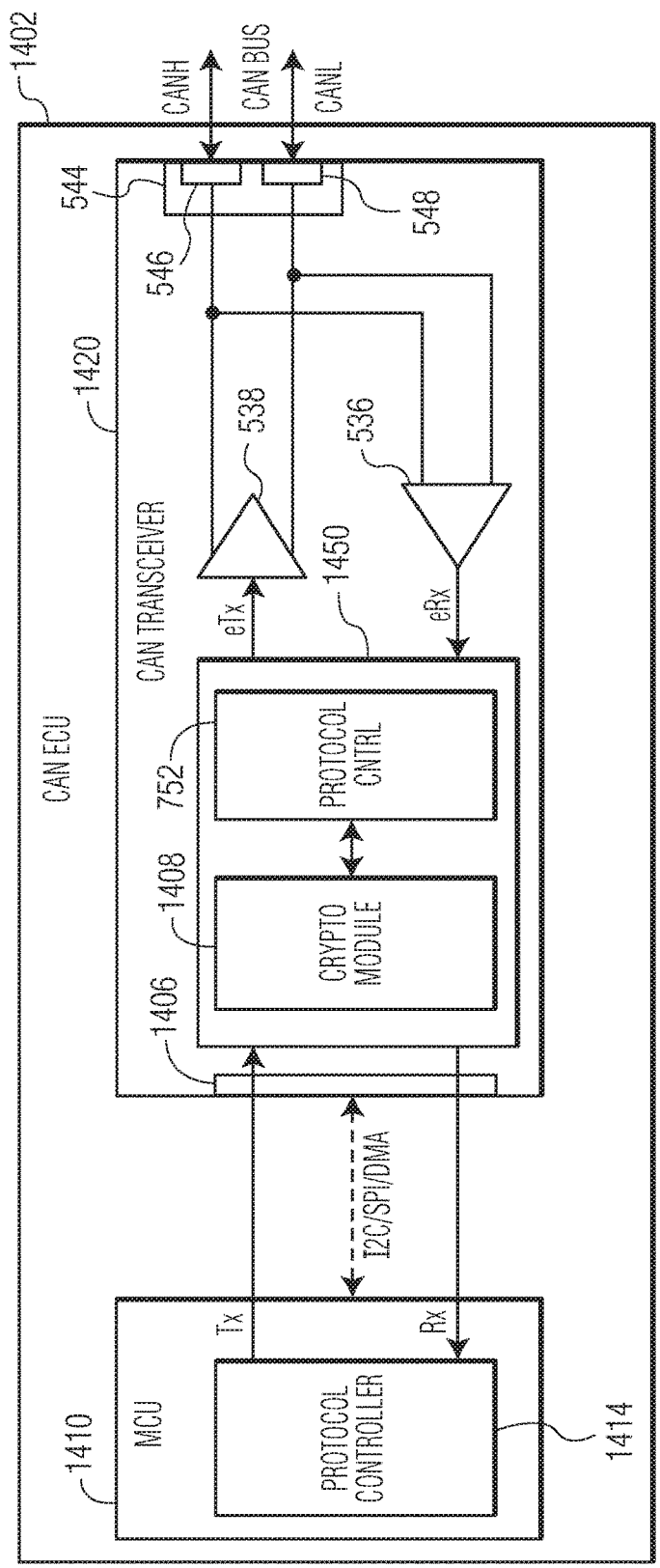
FIG. 14 depicts an embodiment of a CAN ECU that includes a microcontroller and a transceiver that includes a cryptographic module, which is not software reprogrammable.

In some embodiments, functions performed by the programmable cryptographic module 708 depicted in FIG. 7 are performed in non-reprogrammable hardware. FIG. 14 depicts an embodiment of a CAN ECU 1402 that includes a microcontroller 1410 having a CAN protocol controller 1414 and a CAN transceiver 1420 that includes a cryptographic module 1408 that is not software reprogrammable. As shown in FIG. 14 and similar to the CAN transceiver 702 shown in FIG. 7, the CAN transceiver 1402 also includes the receiver 536, the transmitter 538, a microcontroller communications interface 1406, and the CAN bus interface 544 having the CANH bus interface 546 and the CANL bus interface 548. The cryptographic module 1408 depicted in FIG. 14 can perform the same or similar functions as the programmable cryptographic module 708 depicted in FIG. 7. Compared to the programmable cryptographic module 708 depicted in FIG. 7, the cryptographic module depicted in FIG. 14 can be produced more cost-efficiently. However, the cryptographic module depicted in FIG. 14 is not as flexible as the programmable cryptographic module depicted in FIG. 7. Typically, the non-reprogrammable cryptographic module can perform a more limited and predefined set of security functions. In an embodiment, the cryptographic module cannot be reprogrammed (e.g., reflashed) to perform a different set of security functions. In some embodiments, the cryptographic module 1408 includes a random number generator that is implemented in hardware with around 5,000 logic gates, an encryption/decryption engine that is implemented in hardware with around 18,000 to 30,000 logic gates, and a NVM that is implemented in hardware with around 2,000 logic gates to 3,000 logic gates.

Figure 15:
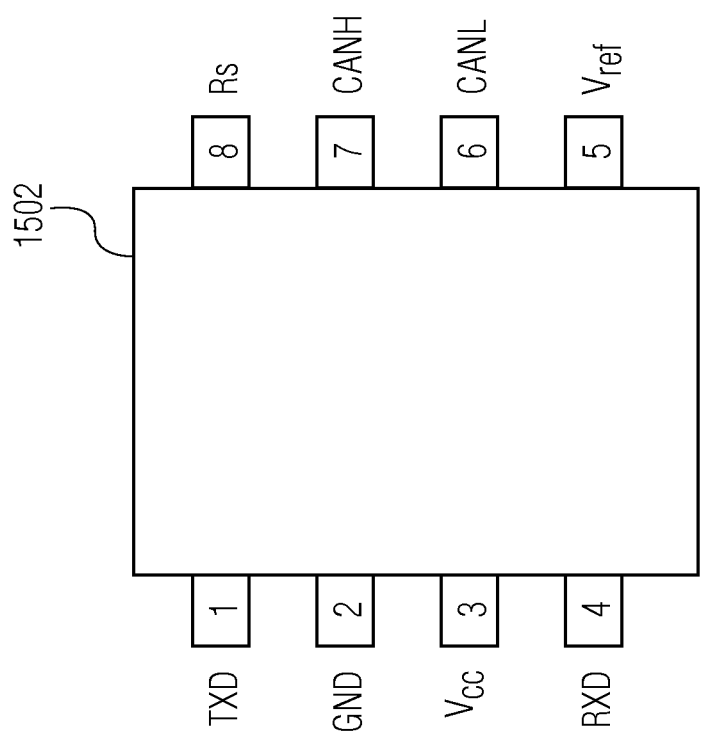
FIG. 15 depicts the transceiver depicted in FIG. 4 embodied as a packaged IC device.

FIG. 15 depicts the transceiver 420 depicted in FIG. 4 embodied as a packaged IC device 1502. The packaged IC device 1502 includes the microcontroller communications interface 406, the security module 408, and the IVN bus interface 444. As shown in FIG. 15, the packaged IC device of the transceiver 420 includes 8 pins/terminals, TXD (pin 1, transmit data input), GND (pin 2, ground), VCC (pin 3, supply voltage), RXD (pin 4, receive data output), Vref (pin 5, reference voltage output), CANL (pin 6, LOW-level CAN voltage input/output), CANH (pin 7, HIGH-level CAN voltage input/output), Rs (pin 8, operational mode selection). In some embodiments, the packaged IC device of the transceiver includes one or more SPI/I2C/DMA pins, instead of the TXD and RXD pins. The packaged IC device depicted in FIG. 15 is one possible packaged IC device of the transceiver 420 depicted in FIG. 4. However, the packaged IC device of the transceiver 420 depicted in FIG. 4 is not limited to the embodiment shown in FIG. 15. For example, in embodiments where the transceiver does not include RX/TX interfaces, the packaged IC device does not include TXD/RXD pins. In another example, the packaged IC device may include more than 8 pins to implement more I/O functions.

Figure 16:
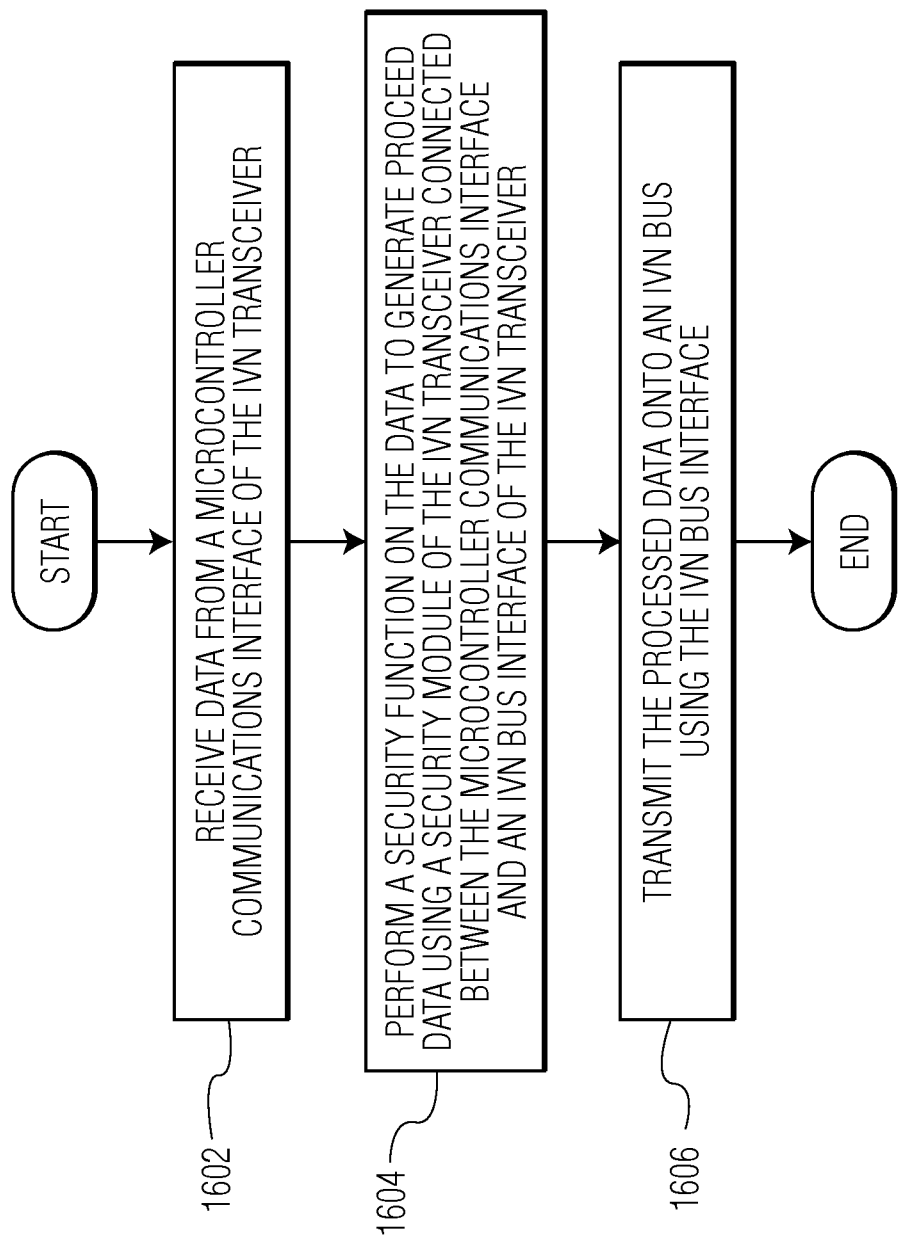
FIG. 16 is a process flow diagram of a method for operating an IVN transceiver in accordance with an embodiment of the invention.

FIG. 16 is a process flow diagram of a method for operating an IVN transceiver in accordance with an embodiment of the invention. At block 1602, data is received from a microcontroller using a microcontroller communications interface of the IVN transceiver. At block 1604, a security function is performed on the data to generate processed data using a security module of the IVN transceiver connected between the microcontroller communications interface and an IVN bus interface of the IVN transceiver. At block 1606, the processed data is transmitted onto an IVN bus using the IVN bus interface. The IVN transceiver may be the same as or similar to the CAN transceiver 120 depicted in FIG. 1, the transceiver 420 depicted in FIG. 4, the CAN transceiver 520 depicted in FIG. 5, the CAN transceiver 720 depicted in FIG. 7, the CAN transceiver 820 depicted in FIG. 8, the CAN transceiver 920 depicted in FIG. 9, and the CAN transceiver 1420 depicted in FIG. 14.

Techniques described herein can be applied to any type of IVNs, including a CAN, a LIN, a MOST network, a FlexRay™ compatible network, and other types of IVNs. Although in some embodiments CAN transceiver is described, it should be noted that the invention is not restricted to CAN transceivers.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An in-vehicle network (IVN) transceiver, the IVN transceiver comprising:
   a packaged integrated circuit (IC) device including;
      an IVN bus interface for communicating with an IVN bus that is external to the packaged IC device;
      a microcontroller communications interface for communicating with a microcontroller communications interface that is external to the packaged IC device; and a security module connected between the IVN bus interface and the microcontroller communications interface and configured to perform a security function within the packaged IC device;
wherein the security module comprises a programmable cryptographic module configured to execute security software programs;
wherein the programmable cryptographic module is configured to:
extract a data payload from a plurality of data frames received through the microcontroller communications interface; and
process the data payload to generate a Cipher-based Message Authentication Code (CMAC) digest,
wherein the IVN transceiver further comprises a protocol controller configured to combine the payload with the CMAC digest.

2. The IVN transceiver of claim 1, wherein the programmable cryptographic module comprises:
a security core configured to execute security software routines;
a random number generator configured to generate an encryption key;
an encryption engine configured to perform message encryption using the encryption key; and
a non-volatile memory (NVM) configured to store the encryption key.

3. The IVN transceiver of claim 2, wherein the encryption engine is further configured to perform message decryption using a decryption key, and wherein the NVM is further configured to store the decryption key.

4. The IVN transceiver of claim 2, wherein the NVM is further configured to store a set of policies for intrusion detection or intrusion prevention, and wherein the programmable cryptographic module comprises logic configured to implement detection or intrusion prevention.

5. The IVN transceiver of claim 1, wherein the programmable cryptographic module is configured to:
extract a data payload from a plurality of data frames received through the microcontroller communications interface; and
encrypt the data payload with an encryption key to generate an encrypted data payload,
wherein the IVN transceiver further comprises a protocol controller configured to create a data frame to be transmitted through the IVN bus interface from the encrypted data payload.

6. The IVN transceiver of claim 1, wherein the security module comprises a stream cipher circuit configured to perform stream cipher encryption and/or stream cipher decryption.

7. The IVN transceiver of claim 6, wherein the stream cipher circuit comprises:
a random number generator configured to generate an encryption keystream;
a processing unit configured to encrypt a plaintext message with the encryption keystream to generate a ciphertext stream; and
a storage unit configured to store the encryption keystream and/or the ciphertext stream.

8. The IVN transceiver of claim 6, wherein the stream cipher circuit is configured to process a Controller Area Network (CAN) payload without modifying the format of the CAN payload.

9. The IVN transceiver of claim 1, wherein the security module is configured to perform at least one of:
intrusion detection or intrusion prevention;
message encryption or message decryption;
packet filtering; and
message authentication.

10. The IVN transceiver of claim 9, wherein the security module is configured to perform stream cipher encryption and decryption or block cipher encryption and decryption.

11. The IVN transceiver of claim 9, wherein the security module is configured to perform at least one of frame identification inspection and deep packet inspection.

12. The IVN transceiver of claim 1, further comprising a decoder configured to decode messages received on the microcontroller communications interface.

13. The IVN transceiver of claim 1, further comprising a transmitter and a receiver.

14. An electronic control unit comprising the IVN transceiver of claim 1 and a microcontroller, wherein the microcontroller communications interface of the IVN transceiver is used for communications with the microcontroller.

15. The IVN transceiver of claim 1, wherein the IVN transceiver comprises a Controller Area Network (CAN) transceiver.

16. A Controller Area Network (CAN) transceiver comprising:
a packaged integrated circuit (IC) device including;
a CAN bus interface having a CAN high (CANH) bus interface and a CAN low (CANL) bus interface for communicating with a CAN bus that is external to the packaged IC device;
a microcontroller communications interface for communicating with a microcontroller that is external to the packaged IC device; and
a security module connected between the CAN bus interface and the microcontroller communications interface and configured to perform, within the packaged IC device, at least one of:
intrusion detection or intrusion prevention;
message encryption or message decryption;
packet filtering; and
message authentication;
wherein the security module comprises a programmable cryptographic module configured to execute security software programs;
wherein the programmable cryptographic module is configured to:
extract a data payload from a plurality of data frames received through the microcontroller communications interface; and
process the data payload to generate a Cipher-based Message Authentication Code (CMAC) digest,
wherein the CAN transceiver further comprises a protocol controller configured to combine the payload with the CMAC digest.

17. A method for operating an in-vehicle network (IVN) transceiver, the method comprising:
receiving data from a microcontroller using a microcontroller communications interface of the IVN transceiver, wherein the IVN transceiver is included in a packaged integrated circuit (IC) device, and wherein the microcontroller is external to the packaged IC device;
performing a security function within the packaged IC device on the data to generate processed data using a security module of the IVN transceiver connected between the microcontroller communications interface and an IVN bus interface of the IVN transceiver, wherein the IVN bus interface is included within the packaged IC device; and transmitting the processed data onto an IVN bus that is external to the packaged IC device using the IVN bus interface;

wherein performing a security function comprises:

extracting a data payload from a plurality of data frames received through the microcontroller communications interface;

processing the data payload to generate a Cipher-based Message Authentication Code (CMAC) digest; and combining the payload with the CMAC digest.

* * * * *